(12) United States Patent
Hayashi

(10) Patent No.: US 11,967,293 B2
(45) Date of Patent: Apr. 23, 2024

(54) ELECTRONIC DEVICE AND DISPLAY DEVICE

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/071,694

(22) Filed: Nov. 30, 2022

(65) Prior Publication Data

US 2023/0090207 A1    Mar. 23, 2023

Related U.S. Application Data

(63) Continuation of application No. PCT/JP2021/019583, filed on May 24, 2021.

(30) Foreign Application Priority Data

Jun. 1, 2020    (JP) ................. 2020-095485

(51) Int. Cl.
*G09G 3/34*     (2006.01)
*G02F 1/167*    (2019.01)
*G02F 1/16766*  (2019.01)
*G09G 3/00*     (2006.01)

(52) U.S. Cl.
CPC ............ *G09G 3/344* (2013.01); *G02F 1/167* (2013.01); *G02F 1/16766* (2019.01); *G09G 3/006* (2013.01)

(58) Field of Classification Search
CPC .................................................. G09G 3/3233
See application file for complete search history.

(56) References Cited

U.S. PATENT DOCUMENTS

| | | | |
|---|---|---|---|
| 6,049,320 A * | 4/2000 | Yeo ...................... | G09G 3/3688 345/98 |
| 2007/0234151 A1 | 10/2007 | Hsu et al. | |
| 2014/0085277 A1 * | 3/2014 | Iwaki .................. | G06F 3/04883 345/55 |
| 2016/0125775 A1 * | 5/2016 | Lv ......................... | G09G 3/006 345/100 |
| 2017/0213499 A1 * | 7/2017 | Kong ..................... | G11C 19/28 |
| 2021/0043621 A1 * | 2/2021 | Long .................. | H01L 27/0248 |

OTHER PUBLICATIONS

International Search Report dated Aug. 10, 2021 for the corresponding PCT Application No. PCT/JP2021/019583, with English machine translation.

* cited by examiner

*Primary Examiner* — Nan-Ying Yang
(74) *Attorney, Agent, or Firm* — Michael Best & Friedrich LLP

(57) ABSTRACT

According to one embodiment, an electronic device includes scanning, signal, pixels, and an inspection circuit disposed in a non-display area and including first switch elements connected to the scanning lines, the first switch elements are oxide semiconductor transistors including an oxide semiconductor layer, and each of the first switch elements of the inspection circuit includes at least two transistors connected in series to one of the scanning lines.

13 Claims, 9 Drawing Sheets

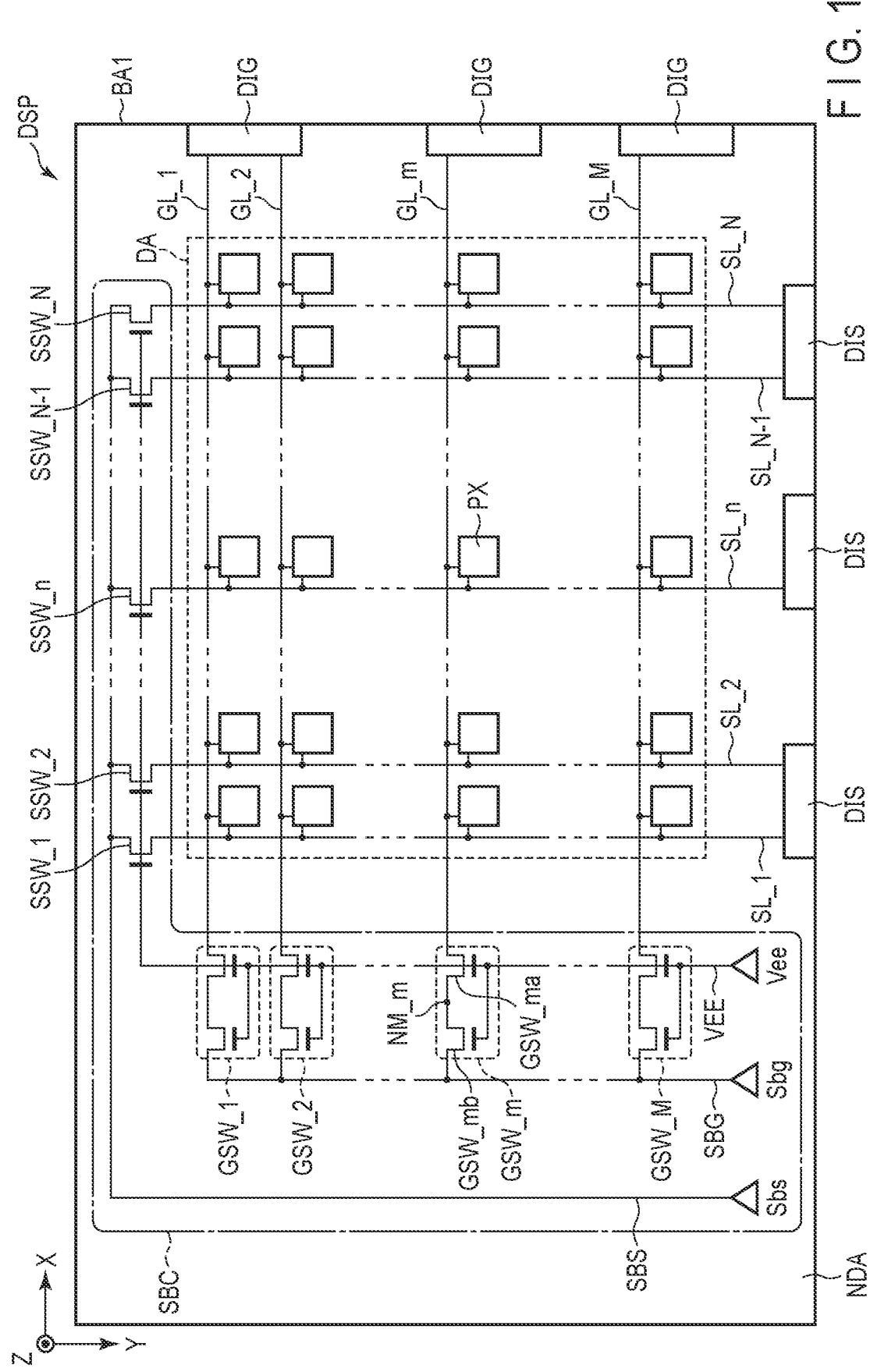
F I G. 1

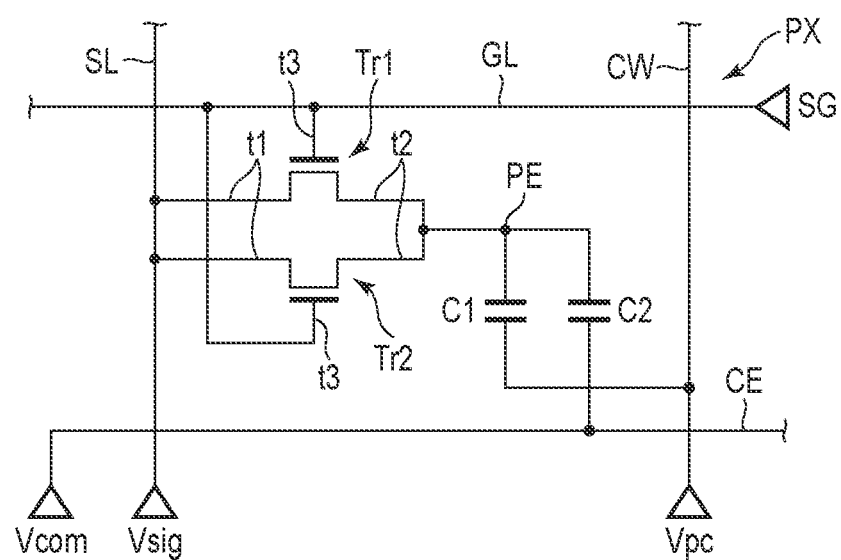
F I G. 3

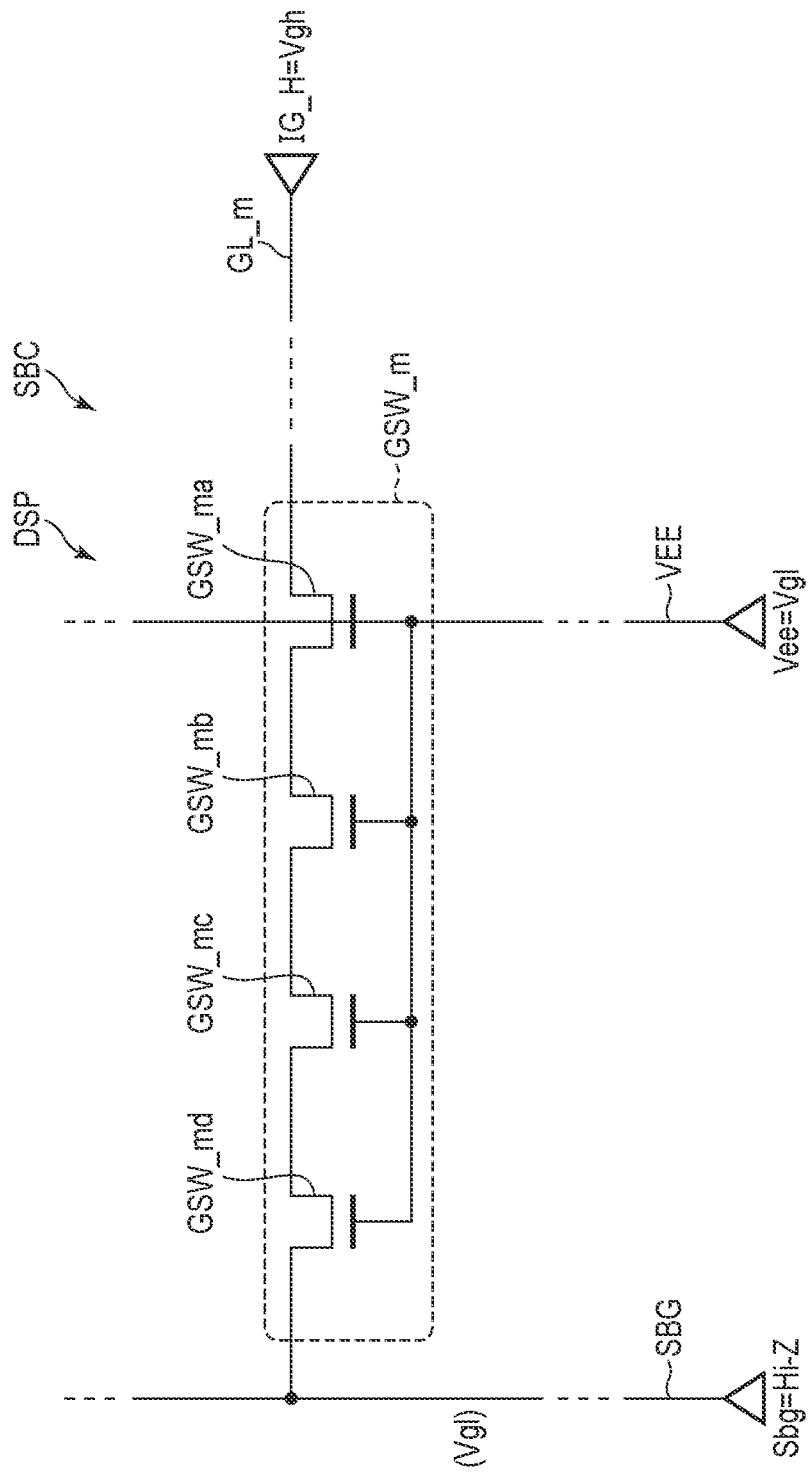
F I G. 7

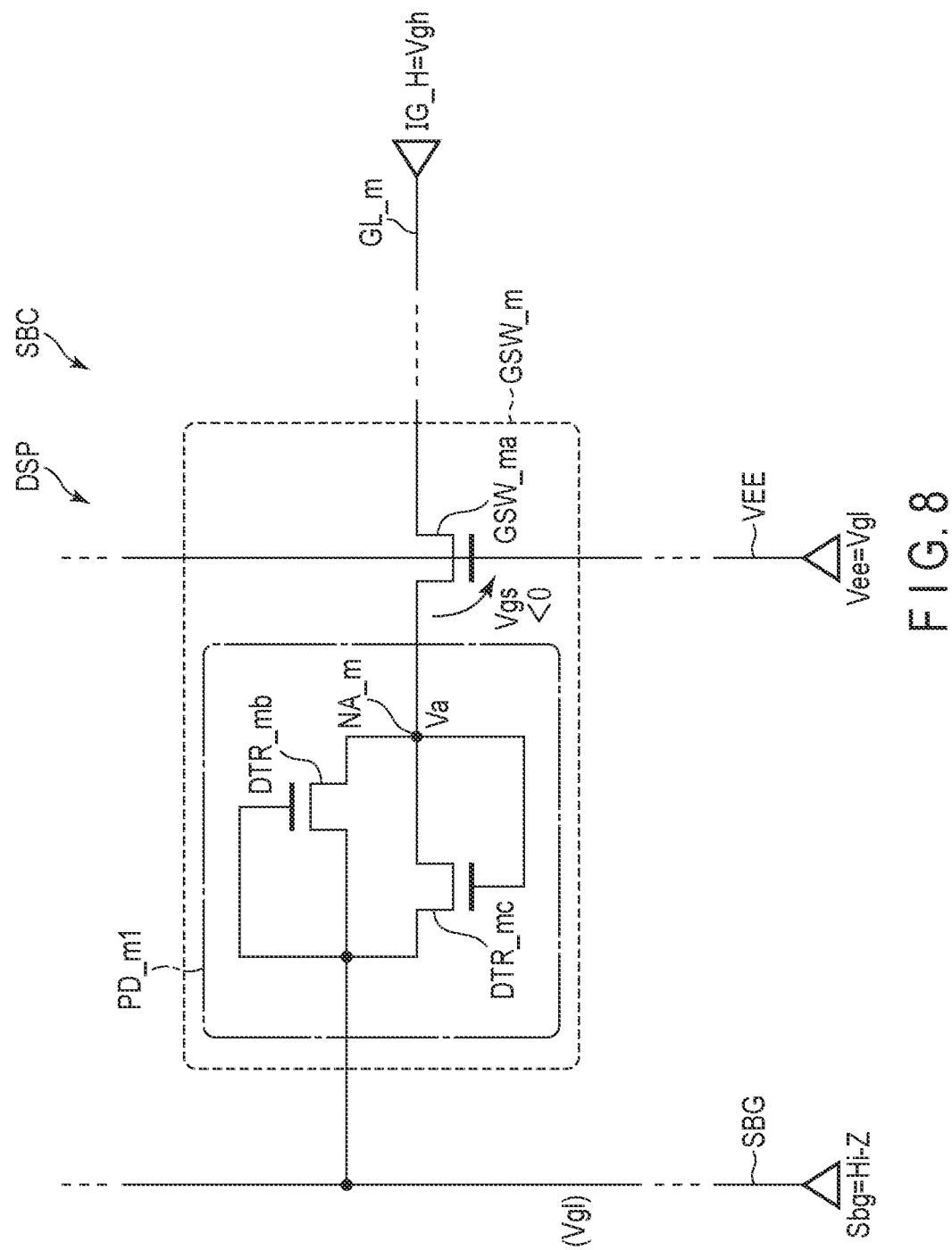
F I G. 8

ELECTRONIC DEVICE AND DISPLAY DEVICE

CROSS-REFERENCE TO RELATED APPLICATIONS

This application is a Continuation application of PCT Application No. PCT/JP2021/019583, filed May 24, 2021, and based upon and claiming the benefit of priority from Japanese Patent Application No. 2020-095485, filed Jun. 1, 2020, the entire contents of all of which are incorporated herein by reference.

FIELD

Embodiments described herein relate generally to an electronic device, in particular, a display device.

BACKGROUND

As display devices, which are examples of electronic devices, for example, electrophoretic display devices are known. In such electrophoretic display devices, a drive circuit is provided for inspection.

BRIEF DESCRIPTION OF THE DRAWINGS

FIG. 1 is a planar circuit diagram of a display device of an embodiment.

FIG. 3 is a circuit diagram of pixels shown in FIG. 1.

FIG. 7 is a circuit diagram of another configuration example of the display device in the embodiment.

FIG. 8 is a circuit diagram of still another configuration example of the display device in the embodiment.

DETAILED DESCRIPTION

Figure 2:
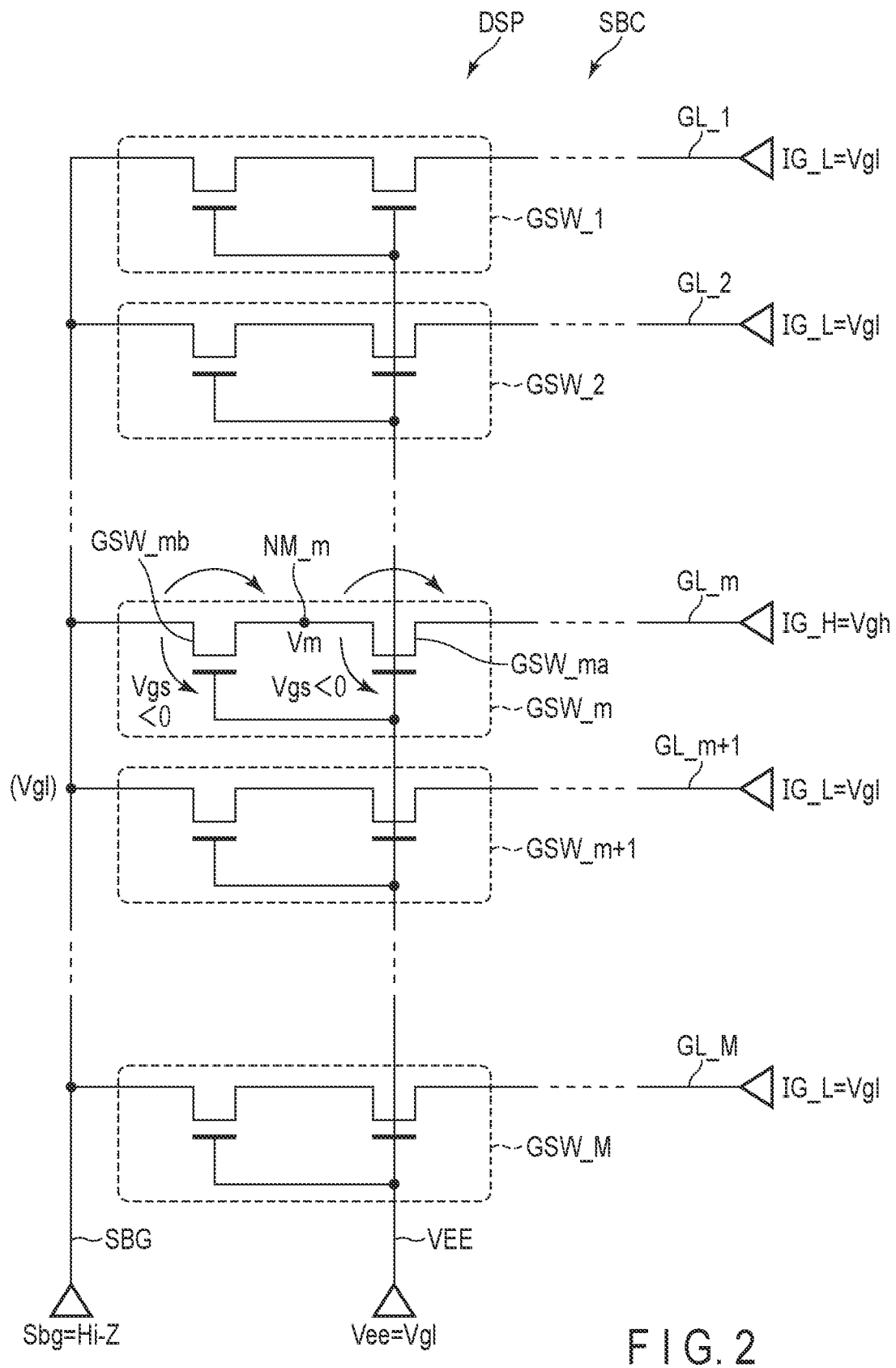
FIG. 2 is a partially enlarged view of FIG. 1.

In general, according to one embodiment, an electronic device comprises a plurality of scanning lines extending along a first direction and aligned along a second direction intersecting the first direction; a plurality of signal lines extending along the second direction and aligned the first direction; a plurality of pixels disposed in a display area and provided at intersections of the plurality of scanning lines and the plurality of signal lines; and an inspection circuit disposed in a non-display area different from the display area and including a plurality of first switch elements connected to the plurality of scanning lines, wherein the plurality of first switch elements is oxide semiconductor transistors including an oxide semiconductor layer, and each of the plurality of first switch elements of the inspection circuit includes at least two transistors connected in series to one of the plurality of scanning lines.

According to another embodiment, an electronic device comprises a plurality of scanning lines extending along a first direction and aligned along a second direction intersecting the first direction; a plurality of signal lines extending along the second direction and aligned along the first direction; a plurality of pixels disposed in a display area and provided at intersections of the plurality of scanning lines and the plurality of signal lines; and an inspection circuit disposed in a non-display area different from the display area, including a plurality of first switch elements connected to the plurality of scanning lines, wherein the plurality of first switch elements of the inspection circuit are oxide semiconductor transistors including an oxide semiconductor layer, each of the plurality of first switch elements includes a first transistor and at least one transistor pair, and the at least one transistor pair includes a second transistor and a third transistor which are bi-directionally connected each other and each of which is diode-connected.

According to another embodiment, a display device comprising: a plurality of scanning lines extending along a first direction and aligned along a second direction intersecting the first direction; a plurality of signal lines extending along the second direction and aligned the first direction; a plurality of pixels disposed in a display area and provided at intersections of the plurality of scanning lines and the plurality of signal lines; and an inspection circuit disposed in a non-display area different from the display area and including a switch element and a voltage drop element connected to the switch element, connected to each of the plurality of scanning lines, wherein the switch element and the voltage-drop element are oxide semiconductor transistors including an oxide semiconductor layer.

An object of the embodiments is to provide a display device which can suppress degradation of display quality. According to the embodiments, an electronic device, in particular, a display device which can suppress failure of a power circuit or a drive element.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The followings are detailed descriptions of a display device according to one embodiment with reference to the drawings.

In the embodiment, a first direction X, a second direction Y and a third direction Z are orthogonal to each other, but they may intersect at an angle other than 90 degrees. In the following descriptions, a direction forwarding a tip of an arrow indicating the third direction Z is referred to as "upward" or "above" and a direction forwarding oppositely from the tip of the arrow is referred to as "downward" or "below".

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in the third direction Z, and viewing from this observation position toward the X-Y plane defined by the first direction X and the second direction Y is referred to as a planar view. Viewing a cross section of the transistor in an X-Z plane defined by the first direction X and the third direction Z or a Y-Z plane defined by the second direction Y and the third direction Z is referred to as a cross-sectional view.

[Embodiment]

FIG. 1 is a planar circuit diagram of a display device of an embodiment. The display device DSP shown in FIG. 1 comprises a display area DA for displaying images and a non-display area NDA other than the display area DA. In this embodiment, the non-display area NDA is a different area from the display area DA and is formed into a frame shape along the display area DA.

As shown in FIG. 1, the display device DSP comprises a base BA1, a plurality of pixels PX arranged in a matrix above the base BA1 in the display area DA, a plurality of scanning lines GL and a plurality of signal lines SL. Each of the pixels PX is located at the respective intersection between each of the scanning lines GL and each respective one of the signal lines SL. The scanning lines and signal lines may as well be referred to as gate lines and source lines, respectively.

In this embodiment, the number of scanning lines GL is M, which include from a scanning line GL_1 to a scanning line GL_M. But, when there is no need to individually distinguish one particular scanning line from another, they are simply referred to as scanning lines GL. Further, the number of signal lines SL is N, which include a signal line SL_1 to a signal line SL_N. Again, when there is no need to individually distinguish one particular signal line from another, they are simply referred to as signal lines SL. That is, the display device DSP includes pixels PX of M rows and N columns.

The display device DSP includes a drive element DIG which drives the scanning lines GL and a drive element DIS which drives the signal lines SL. The drive element DIG and the drive element DIS are disposed in the non-display area NDA. Note that the number of scanning lines GL connected to one drive element DIG is not limited to that shown in FIG. 1, but an appropriate number of scanning lines GL may be provided. Similarly, the number of signal lines SL connected to one drive element DIS is not limited to that shown in FIG. 1, but an appropriate number of signal lines SL may be provided. Note that in this embodiment, the drive elements DIG and DIS drive the scanning lines GL and signal lines SL as described above, and therefore it can as well be referred to as that they drive pixels PX provided at the intersections thereof.

Further, in the display device DSP shown in FIG. 1, the drive elements DIG and DIS are each provided on one side of the base BA1. More specifically, the drive elements DIG are provided on a right side of the base BA1 and the drive elements DIS are provided on a lower side of base BA1, but the arrangement is not limited to that of this example. For example, the drive elements DIG may be provided on two side, the left and right, of the base BA1. The odd-numbered scanning lines GL may be driven by those of the drive elements DIG which are provided on one of the two on the left and right sides, and the even-numbered scanning lines GL may be driven by those of the drive elements DIG which are provided on the other one of the two on the left and right sides. Similarly, the drive elements DIS may be provided on upper and lower two sides of the base BA1. The odd-numbered signal line SL may be driven by those of the drive elements DIS which are provided on one of the two upper and lower sides, and the even-numbered signal lines SL may be driven by those of the drive elements DIG provided on the other of the two upper and lower sides. Further, the drive elements DIG may be provided on both or one of the left and right sides of the base BA1, and the drive elements DIS may be provided on both or one of the upper and lower sides of the base BA1.

The scanning lines GL are connected to the drive elements DIG, extend along the first direction X and are aligned long the second direction Y. The scanning lines GL are electrically connected to a plurality of pixels PX aligned along the first direction X. The signal lines SL are connected to the drive element DIS, extend along the second direction Y, and are aligned along the first direction X. The signal lines SL are electrically connected to a plurality of pixels PX aligned along the second direction Y.

Although not shown in FIG. 1 to make the drawing more understandable, the display device DSP may further comprise common wiring lines and capacitive wiring lines. The common wiring lines and capacitive wiring lines will be described in detail later.

The display device DSP shown in FIG. 1 comprises a drive circuit SBC in the non-display area NDA. The drive circuit SBC includes switch elements GSW connected respectively to the scanning lines GL, and switch elements SSW respectively connected to the signal lines SL. Note that in this embodiment, the switch elements GSW may as well be referred to as the first switch elements and the switch elements SSW may as well be referred to as the second switch elements.

Here, a switch element GSW connected to a scanning line GL_m of an arbitrary m-th row (where m represents a natural number of 1 or more and M or less ($1 \leq m \leq M$)) is represented by a switch element GSW_m. Further, a switch element SSW connected to a signal line SL_n of an arbitrary column n (where n represents a natural number of 1 or more and N or less ($1 \leq n \leq N$)) is represented by a switch element SSW_n. Note that the switch elements GSW_1 to GSW_M connected respectively to the first row to the M-th row may be referred to simply as switch elements GSW when there is no need to particularly distinguish one from another therebetween. Similarly, the switch elements SSW_1 to SSW_N connected respectively to the first column to the N-th column may be referred to simply as switch elements SSW when there is no need to particularly distinguish one from another therebetween.

Here, in the description of the transistors of this embodiment to be described later, the sources and drains of the transistors may be interchanged from each other, and therefore one source may be regarded as one of the source and drain when reading, or one drain as the other of the source and drain. The transistor shown in FIG. 1 is a thin film transistor (TFT). The transistor shown in FIG. 1 is, for example, an oxide semiconductor transistor in which the semiconductor layer is an oxide semiconductor.

In the display device DPS shown in FIG. 1, each switch element SSW is a single transistor. Such a transistor may be an oxide semiconductor transistor described above. The gate of the switch element SSW, which is a transistor, is connected to a wiring line VEE. The source of the switch element SSW is connected to a wiring line SBS. The drain of the switch element SSW is connected to a corresponding signal line SL. For example, the drains of the switch elements SSW on the n-th column, which is arbitrary, are connected to the signal line SL_n.

Here, the voltage input to the gates of the switch elements GSW via the wiring line VEE is expressed by a voltage Vee (or signal Vee). The voltage input to the sources of the switch elements SSW via the wiring line SBS is expressed by a voltage Sbs (or signal Sbs).

In the example shown in FIG. 1, the switch elements GSW each include two transistors GSW_a and GSW_b. To be more specific, the switch element GSW_a, which is connected to the scanning line GL_m of the m-th row includes two transistors GSW_ma and GSW_mb.

Note that the switch elements GSW_1 to GSW_M respectively connected to the first row to the M-th row each includes two transistors. These two transistors may be simply referred to as transistors GSW_a and GSW_b if there is no need to particularly distinguish the rows from one another. Further, in this embodiment, the transistor GSW_ma (transistor GSW_a) and the transistor GSW_mb (transistor GSW_b) may as well be referred to as the first transistor and the second transistor, respectively.

In the switch elements GSW_m on the m-th row, the gate of the transistor GSW_ma is connected to the gate of the transistor GSW_mb and the wiring line VEE. The source of the transistor GSW_ma is connected to the drain of the transistor GSW_mb. The drain of the transistor GSW_ma is connected to the scanning line GL_m.

The source of the transistor GSW_mb is connected to the wiring line SBG. The voltage input to the source of the transistor GSW_mb (switch element GSW_m) the wiring line SBG is expressed by a voltage Sbg (or signal Sbg).

Note that in FIG. 1, the source of the transistor GSW_ma and the drain of the transistor GSW_mb are expressed as a node NM_m.

The above-provided descriptions are directed to the m-th row, which is arbitrary, and the same can be applied to other arbitrary rows. In this embodiment, m-th row may be sometimes referred to as the first row and some other row as the second row. For example, the scanning line GL_m on the m-th row may be referred to as the scanning line GL_m in the first row, whereas some other row which is different from the m-th row, that is, more specifically, the scanning line GL_m+1 on the (m+1)-th row line may as well be referred to as the scanning line GL_m+1 of the second row.

FIG. 2 is a partially enlarged view of FIG. 1. FIG. 2 shows switch elements GSW, scanning lines GL, wiring lines SBG and wiring lines VEE of the drive circuit SBC shown in FIG. 1. In FIG. 2, for the components of the same symbols as those in FIG. 1, the explanations used in connection with FIG. 1 will be applied and the details will be omitted. Further, the operation of the drive circuit SBC shown in FIG. 2 will be described in detail later.

FIG. 3 is a circuit diagram of a pixel shown in FIG. 1. The pixel PX shown in FIG. 3 includes transistors Tr1 and Tr2, which are pixel transistors. Further, the pixel PX includes a first capacitance C1, a second capacitance C2, a capacitive wiring line CW, and a counter electrode CE. The pixel PX shown in FIG. 3 as well will be described in detail later.

Here, the drive circuit SBC of the embodiment will now be described. The drive circuit SBC is a circuit for inspecting the display area DA of the display device DSP for defects before mounting the drive elements DIG and DIS. Therefore, the drive circuit SBC may be referred to as an inspection circuit SBC. The drive circuit SBC turns on the pixels PX in the display area DA (into a conductive state) collectively and inputs image signals thereto. Thus, all the pixels PX can be subjected to display operation.

The following are more specific descriptions thereof. That is, in the drive circuit SBC, a voltage Vee is input to the switch elements GSW and SSW from the wiring line VEE. The voltage Vee at this stage is a high power supply voltage described later, and therefore the switch elements GSW and SSW are set in an ON state. When a voltage Sbg is input from the wiring line SBG, the voltage Sbg, which is the same voltage, is input to the pixel transistors (the transistors Tr1 and Tr2 described above) of the pixel PX via the switch elements GSW, which is in the ON state, and further the scanning line GL connected to the switch element GSW. Thus, the pixel transistors of all the pixels PX are set to the ON state.

Further, when the voltage Sbs is input from the wiring line SBS, the voltage Sbs equivalent to the image signal is input to the pixel PX via the switch element SSW, which is in the ON state and further the signal line SL connected to the switch element SSW. Here, since the voltage Sbs equivalent to the common image signal is input to all the pixels PX, if there is a defect or the like in a pixel PX, for example, it is possible to detect it. Thus, the display area DA of the display device DSP can be inspected in the above-described manner.

Note that in this embodiment, the wiring line VEE, the wiring line SBG and the wiring line SBS may as well be referred to as the first wiring line, the second wiring line and the third wiring line, respectively. Further, the voltage Vee, the voltage Sbg and the voltage Sbs may as well be referred to as the first voltage, the second voltage and the third voltage, respectively. Furthermore, the low power supply voltage (voltage Vgl) and the high power supply voltage (voltage Vgh), which will be described below, may as well be referred to as the first power supply voltage and the second power supply voltage, respectively.

However, the drive circuit SBC is a circuit used in the above-described inspection and is no longer needed after the inspection is completed. When the drive elements DIG and DIS are mounted after the inspection is completed, the signal to set the pixel transistors of the pixel PX in the ON state (which is the control signal SG to be described later) is input thereto from the drive element DIG. The image signal to the pixel PX (which is the image signal Vsig to be described later) is input thereto from the drive element DIS. Note that in this embodiment, setting the pixel transistors of a pixel PX in the ON state may as well be expressed as setting the pixel PX in the ON state.

Therefore, after the implementation of the drive elements DIG and DIS, the gates of the transistors contained in the switch elements SSW and GSW are fixed to a low power supply voltage. Thus, the drive circuit SBC can be electrically separated from the scanning line GL and the signal line SL. In other words, the voltage Vee applied to the gates of the transistors included in the switch elements SSW and GSW via the wiring line VEE is set to the low power supply voltage.

Figure 4:
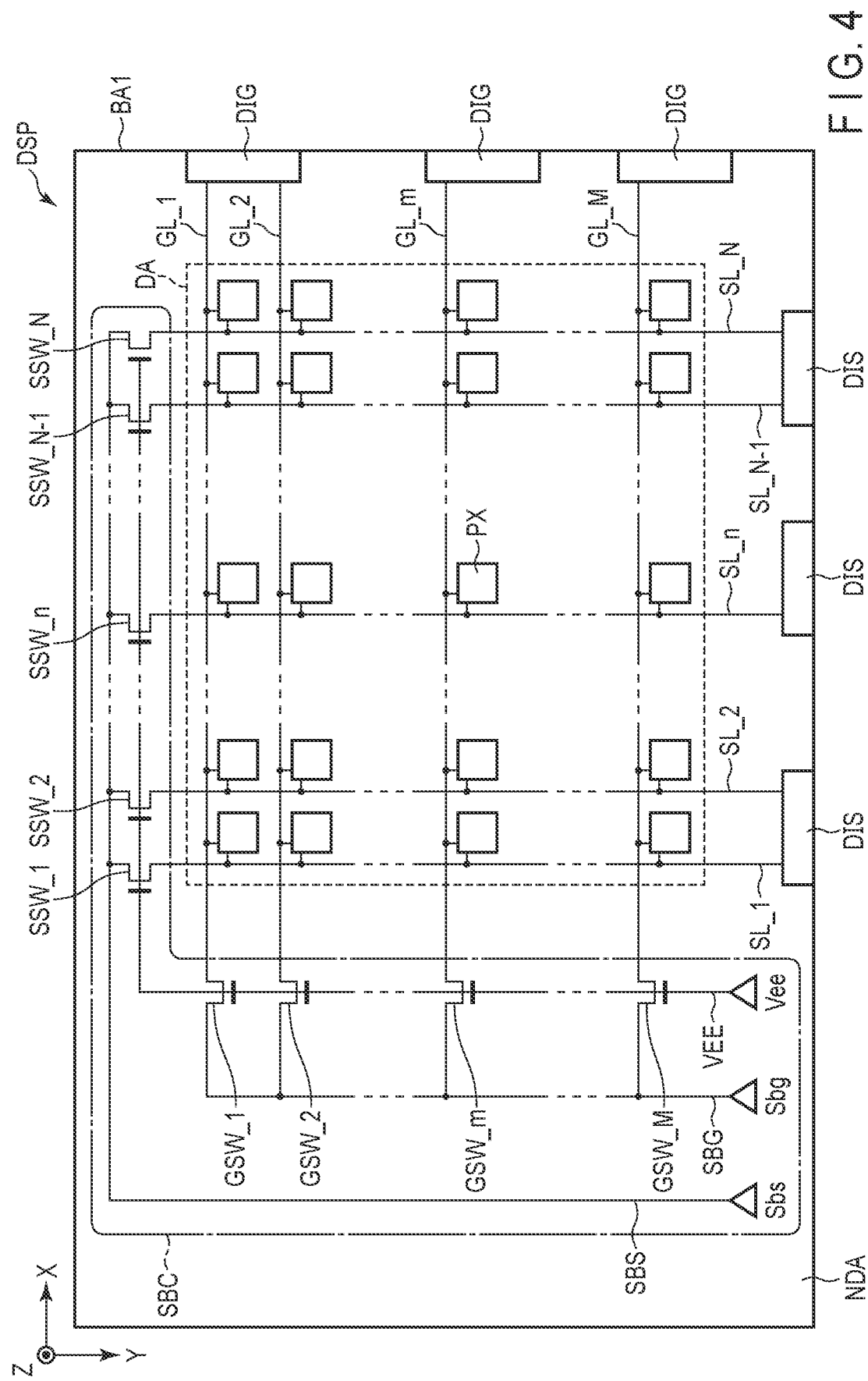
FIG. 4 is a planar circuit diagram of a display device of a comparative example.
Figure 5:
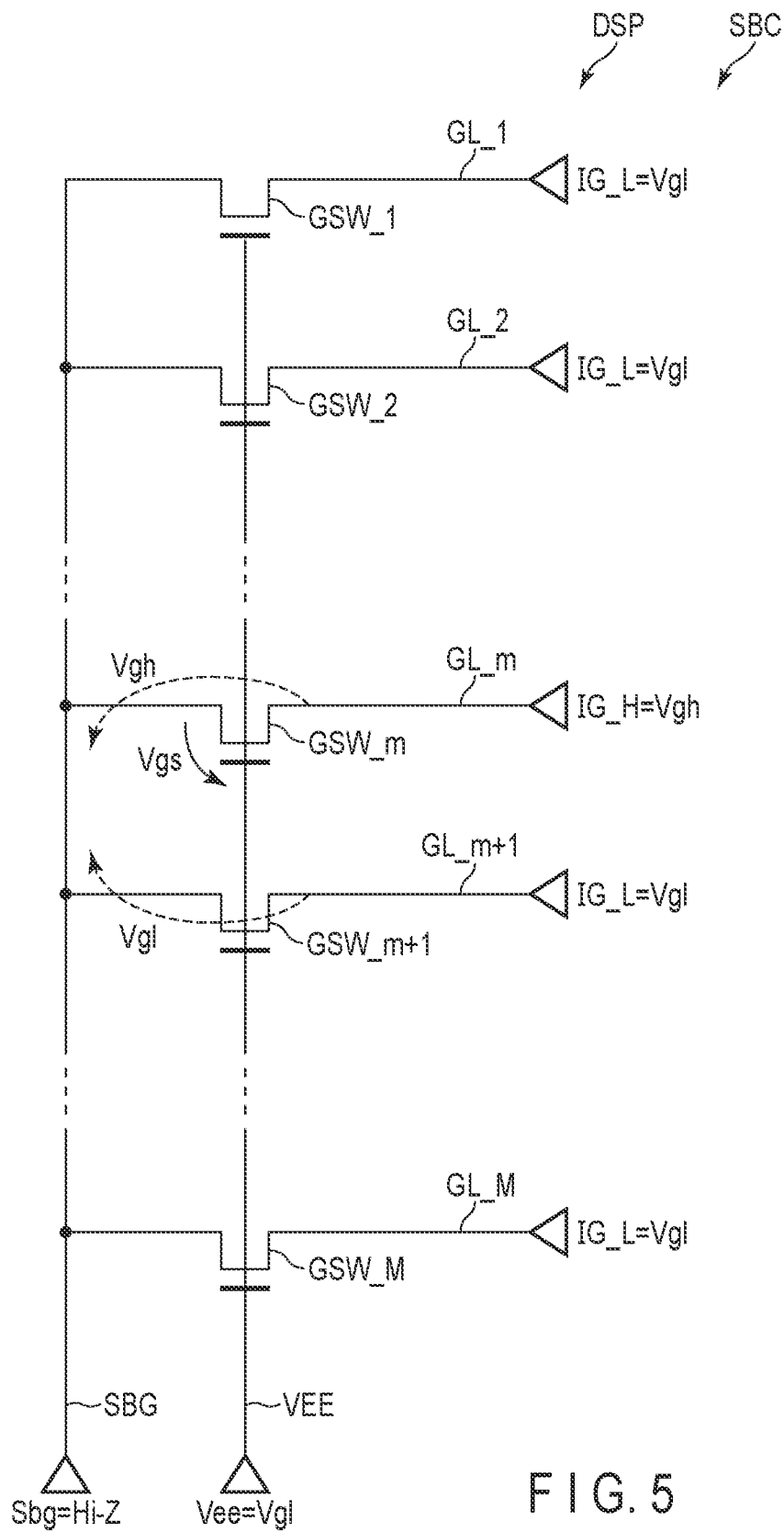
FIG. 5 is a partially enlarged view of FIG. 4.

As a comparative example, let us consider the case where the switch element GSW is constituted by a single transistor. FIG. 4 is a planar circuit diagram of the display device in the comparative example. FIG. 5 is a partially enlarged view of FIG. 4.

The display device DSP shown in FIG. 4 is different from the display device shown in FIG. 1 in that the switch element GSW is constituted by a single transistor as described above. In the example shown in FIG. 4, in the switch element GSW_m of the m-th row, which is arbitrary, the gate of the switch element GSW_m is connected to the wiring line VEE. The source of the switch element GSW_m is connected to the wiring line SBG. The drain of the switch element GSW_m is connected to the scanning line GL_m.

The above-provided descriptions are directed to the m-th row, which is arbitrary, but similar explanations can be applied to other rows.

In the display device DSP shown in FIG. 4, after the implementation of the drive elements DIG and DIS, the gates of the switch elements SSW and GSW are fixed to a low power supply voltage (to be referred to as voltage Vgl hereinafter), and thus the drive circuit SBC is electrically separated from the scanning line GL and the signal line SL.

Here, it is assumed that the sources of all switch elements GSW are in a floating state (high impedance). The sources of all switch elements SSW as well are in a floating state.

However, the switch element GSW, which is a transistor, the threshold Vth may shift to a negative side, that is, deplete. This is particularly noticeable when the transistor is an oxide semiconductor transistor. In the oxide semiconductor transistor, if the channel region is insufficiently oxidized, the threshold Vth of the transistor may shift (deplete) significantly towards a negative direction, resulting in that the transistor does no longer exhibit switching characteristics. The depleted transistor (switch element GSW) is not placed in an OFF state (non-conducting state) even when a voltage Vgl is applied to the gate. Therefore, after the implementation of the drive elements DIG and DIS, there is a possible risk of a short circuit between the rows of the switch elements GSW to which a high power supply voltage (to be referred to as voltage Vgh hereinafter) is applied from the driver element DIG, and the rows of the switch element GSW in the OFF state. The details thereof will be explained below.

In the drive circuit SBC shown in FIG. 5, to the gates of all the switch elements GSW, the voltage Vgl is applied. Here, to the drain of the switch element GSW_m in the m-th row, which is arbitrary, the voltage IG_H is input from the drive element DIG, which is not shown in the figure, via the scanning line GL_m. On the other hand, to the drain of the switch element GSW_m in a row different from the m-th row, the voltage IG_L is input from the drive element DIG, which is not shown in the figure. Note here that the voltage IG_H is a voltage for writing to the scanning line GL, and the voltage IG_L is a voltage for retaining to the scanning line IG_L. That is, the pixels PX connected to the scanning lines GL to which the voltage IG_H is input is set in the ON state. More specifically, the voltage IG_H is input to the gates of the pixel transistors of pixels PX, the pixels PX are set in the ON state.

In FIG. 5, the voltage IG_H is equal to the voltage Vgh and the voltage IG_L is equal to the voltage Vgl. Thus, when, for both pairs of the voltage IG_H and the voltage Vgl and the voltage IG_L and the voltage Vgl, respective common voltages are used, the number of power supply voltages can be reduced.

However, since the voltage IG_L and the voltage Vgl are equal to each other, in order for the switch element GSW, which is a transistor, to be in the OFF state, the voltage Vgs, it is necessary that the voltage Vgs between the gate and source be 0V. When the switch element GSW is depleted, the voltage Vgs can never be 0V. Therefore, the switch element GSW is not set in the OFF state, but may undesirably be in the ON state.

Here, let us focus on the switch element GSW_m on the m-th row and the switch element GSW_m+1 on the (m+1)-th row, which is an adjacent row. Further, let us consider the case where the switch elements GSW_m and GSW_m+1 are both depleted. To the drain of the switch element GSW_m, the voltage IG_H, that is, the voltage Vgh, is input via the scanning line GL_m. To the drain of the switch element GSW_m+1, the voltage IsG_L, that is, the voltage Vgl is input via the scanning line GL_m+1.

Note here that the scanning line GL_m and the switch element GSW_m on the m-th row, the scanning line GL_m+1 and the switch element GSW_m+1 on the (m+1)-th row, which is adjacent to the m-th row are described, but the operation is not limited to these. The scanning line GL_m+1 and the switch element GSW_m+1 on the (m+1)-th row are examples of other scanning lines GL (other rows) and switch elements GSW to which the voltage Vgl is input, that is, examples of scanning lines GL different from the scanning line GL_m and switch elements GSW connected thereto.

The switch elements GSW_m and GSW_m+1 are depleted, and therefore the voltage Vgs as well, which is the voltage between the gate and the source of the switch element GSW_m, becomes the voltage IG_H, which is the voltage for writing to the scanning line GL, that is, the voltage Vgh. The voltage Vgs as well, which is the gate-source voltage of the switch element GSW_m+1, is the voltage IG_L, which is the voltage for retaining to the scanning line GL, that is, the voltage Vgl.

The switch elements GSW_m and GSW_m+1 are electrically connected via the wiring line SBG. Further, the wiring line SBG is in a floating state as described above. As a result, the voltage Vgh of the voltage Vgs of the switch element GSW_m, and the voltage Vgl of the voltage Vgs of the switch element GSW_m+1 are short-circuited by the wiring line SBG.

As described above, when the voltage Vgh and the voltage Vgl are short-circuited via the switch elements GSW_m and GSW_m+1 as described above, the drive element DIG and the power supply circuit which generates the above-described power supply voltage may undesirably fail. Thus, the image quality of the display device DSP may deteriorate or the display device DSP may fail.

According to this embodiment, a display device which can avoid the short-circuiting between the voltage Vgh and the voltage Vgl even when the switch elements GSW are depleted. Thus, it is possible to prevent failures of the drive element DIG and the power supply circuit which generates the power supply voltage described above. Further, the display device DSP itself can be prevented from failing.

Let us now refer back to FIGS. 1 and 2, and describe this embodiment. In the drive circuit SBC as described above, the switch element GSW includes two transistors GSW_a and GSW_b connected in series. In the example shown in FIG. 2, the transistors GSW_ma and GSW_mb contained the switch element GSW_m on the m-th row are connected in series. As described above, the source of the transistor GSW_ma and the drain of the transistor GSW_mb are a node NM_m, and the voltage at the node NM_m is referred to as a voltage Vm.

Let us consider the case where the transistors GSW_ma and GSW_m are depleted as described. The voltage Vm of the node NM_m is an intermediate voltage between the voltage Vgh and the voltage Vgl, and therefore a relationship of Vgh>Vm>Vgl (Formula 1) is established.

In the transistor GSW_ma, the voltage applied to the gate is the voltage Vee and the voltage applied to the source is the voltage Vm. Therefore, the gate-source voltage Vgs of the transistor GSW_ma is expressed by: Vgs=Vee−Vm (Formula 2). Here, as described above, the voltage Vee applied to the gate is equal to the voltage Vgl (Vee=Vgl (Formula 3)).

From Formula 2 and Formula 3, Vgs=Vee−Vm=Vgl−Vm (Formula 4) is obtained. From Formula 4 and Formula 1, Vgs=Vgl−Vm<0 (Formula 5) is obtained.

That is, in the transistor GSW_ma, the gate-source voltage Vgs is lower than 0. Therefore, even if the threshold of the transistor GSW_ma is depleted, the effect of the depletion can be mitigated. The above-provided descriptions are directed to the transistor GSW_ma, but similar discussions can be applied to transistor GSW_mb. The gate-source voltage Vgs of the transistor GSW_mb can be lowered to less than 0. Thus, it is possible to suppress the voltage Vgh from the scanning line GL_m from being input to the wiring line SBG.

Here, focusing on the transistor GSW_mb with respect to the transistor GSW_ma, the transistor GSW_mb can be regarded as an element which gives an intermediate voltage Vm to the node NM_m, which is the source of the transistor GSW_ma. As shown in Formula 1, the voltage Vgh applied to the transistor GSW_ma via the scanning line GL_m is less than the voltage Vm of the node NM_m (the source of GSW_ma). That is, the voltage is dropping between the source and drain of the transistor GSW_ma. Thus, the transistor GSW_mb is regarded as a voltage-drop element with respect to the transistor GSW_ma. That is, in this embodiment, it can be considered that the transistor GSW_ma functions as a switching element and the transistor GSW_mb functions as a voltage drop element with respect to the switching element.

As described above, in the display device DSP of this embodiment, the voltage Vgs from the scanning line GL_m is not input to the wiring line SBG. In the display device DSP of this embodiment, even if the voltage Vgl of the scanning line GL_m+1 is input to the wiring line SBG via the switching element GL_m+1 on the (m+1)-th row, the occurring of the short-circuiting between the voltages Vgh and Vgl described in the comparison example can be suppressed.

In this embodiment, it is possible to suppress the failure of the drive element DIG and the power supply circuit which generates the power supply voltage. Thus, it is possible to prevent deteriorating of the image quality of the display device DSP. Further, the failure of the display device DSP itself can be prevented.

Note here that in the above-provided descriptions, all signal lines SL may be divided into an odd-numbered group and an even-numbered group, and a group of switch elements SSW may be provided for each group separately. Further, all scanning lines GL may be divided into an odd-numbered group and an even-numbered group, and a group of switch elements GSW may be provided for each group separately. One group of switch elements SSW connected to the signal lines SL of the odd-numbered group SLod are connected by one wiring line SBS. One group of the switch elements SSW connected to the signal lines SL of the even-numbered group SLev are connected by another wiring line SBS.

One group of the switch elements GSW connected to the scanning line GL of the odd-numbered group GLod are connected by one wiring line SBG. One group of the switch elements GSW connected to the scanning lines GL of the even-numbered group GLev are connected by another wiring line SBG.

The following is a more detailed explanation. For example, in the case where the signal lines SL are divided into an odd-numbered group SLod and an even-numbered group SLev, when the numeral of a signal line SL is an even number, then the odd group SLod includes the signal lines SL_1, SL_3, ..., and SL_N−1. On the other hand, the even-numbered group SLev includes signal lines SL_2, SL_4, ..., and SL_N. The signal lines SL_1, SL_3, ..., and SL_N−1 included in the odd-numbered group Slod are respectively referred to as signal lines SL_od1, SL_od2, ..., and SL_odN, and the signal lines SL_2, SL_4, ..., SL_N included in the even-numbered group SLev are respectively referred to as signal lines SL_ev1, SL_ev2, ..., SL_evN.

The switch elements SSW_od1, SSW_od2, ..., SSW_odN for the signal lines SL_od1, SL_od2, ..., SL_odN are connected by a wiring line SBSod. The switch elements SSW_ev1, SSW_ev2, ..., SSW_evN for the signal lines SL_ev1, SL_ev2, ..., SL_evN are connected by a wiring line SBSev.

Similarly, when the number M of scanning lines GL is even, the switch elements GSW_od1, GSW_od2, ..., GSW_odM with respect to the scanning lines GL_od1, GL_od2, ..., GL_odM are connected by a wiring line SBGod. The switch elements GSW_ev1, GSW_ev2, ..., GSW_evM with respect to the scanning lines GL_ev1, GL_ev2, ..., GL_evM are connected by a wiring line SBGev.

In such a case, the signal line SL_od1 to the signal line SL_odN and the signal line SL_odN to the signal line SL_odN may be replaced by the signal line SL_1 to the signal line SL_N in FIG. 1 and FIG. 2 and their descriptions. Further, the switch elements SSW_od1, SSW_od2, ..., SSW_odN, and switch elements SSW_ev1, SSW_ev2, ..., SSW_ev2 can be replaced by the switch elements SSW_1 to SSW_N shown in FIG. 1 and FIG. 2 and their descriptions.

The wiring line SBSod and SBSev can be replaced by wiring line SBS in FIGS. 1 and 2 and their descriptions.

Further, the scanning line GL_od1 to the scanning line GL_odM and the scanning line G_ev1 to the scanning line G_evM can be replaced by the scanning line GL_1 to the scanning line GL_M in FIGS. 1 and 2 and the descriptions thereof. Further, the switch elements GSW_od1, GSW_od2, ..., GSW_odM and the switch elements GSW_ev1, GSW_ev2, ..., GSW_odM can be replaced by the switch elements GSW_1 to GSW_M shown in FIGS. 1 and 2 and their descriptions.

The wiring lines SBGod and SBGev can be replaced by wiring lines SBG shown in FIGS. 1 and 2 and their descriptions.

In the above-provided descriptions, the case where the number N of signal lines SL and the number M of scanning lines GL are both even numbers is described, but it is not limited to this case. The number N of signal lines SL and the number M of scanning lines GL may be odd or even, respectively. When the number N of signal lines SL is odd, the signal lines SL included in the odd group SLod are the signal lines SL_1, SL_3, ..., SL_N, whereas the signal lines SL included in the even-numbered group SLev are the signal lines SL_2, SL_4, ..., and SL_N−1. When the number M of scanning lines GL is odd, the scanning lines GL included in the odd-numbered group GLod are scanning lines GL_1, GL_3, ..., GL_M, whereas the scanning lines GL included in the even-numbered group GLev are scanning lines GL_2, GL_4, ..., GL_M−1.

Let us refer back to FIG. 3 and explain the details of the pixel PX. The pixel PX shown in FIG. 3, as described above, includes the transistors Tr1 and Tr2, which are pixel transistors, the first capacitance C1, the second capacitance C2, the capacitive wiring line CW and the counter electrode CE.

The transistors Tr1 and Tr2 each include a first terminal t1, a second terminal t2 and a control terminal t3. In this embodiment, the control terminal t3 functions as a gate, one of the first terminal t1 and the second terminal t2 functions as a source, and the other of the first terminal t1 and the second terminal t2 functions as a drain. The transistors Tr1 and Tr2 are electrically connected in parallel between the signal line SL and the pixel electrode PE.

The transistors Tr1 and Tr2 are, for example, the oxide semiconductor transistors described above.

In each of the transistors Tr1 and Tr2, the first terminal t1 is connected to the signal line SL, the second terminal t2 is connected to the pixel electrode PE, and the control terminal t3 is connected to the scanning line GL. With this configuration, each of the transistors Tr1 and Tr2 is switched between a conducting state and a non-conducting state by the control signal SG given by the drive element DIG via the scanning line GL. The control signal SG includes a voltage IG_H (equal to the voltage Vgh) and a voltage IG_L (equal to voltage Vgl), and as described above, the transistors Tr1 and Tr2 to which the voltage IG_H (voltage Vgh) is input, are set in the conducting state. The transistors Tr1 and Tr2, when the voltage IG_L (voltage Vgl) is input thereto, are set in the non-conducting state. In this embodiment, the situation where the transistors Tr1 and Tr2 of the pixel PX are in the conducting state may as well be referred to as that the pixel PX is set in the conducting state.

The image signal Vsig is applied to the pixel electrode PE via the signal line SL and the transistors Tr1 and Tr2 which are in the conducting state. After the implementation of the drive element DIS, the image signal Vsig is input from the drive element DIS. As described above, when display operation is carried out in the drive circuit SBC before the drive element DIS is implemented, the voltage Sbs equivalent to the image signal is input to the pixel PX via the switch element SSW and the signal line SL.

The capacitive wiring line CW extends along the first direction X or the second direction Y. In this embodiment, the capacitive wiring line CW extends along the second direction Y and is electrically connected to a plurality of pixels PX aligned along the second direction Y. Here, in order to make the descriptions of the drawings easily understandable, the capacitive wiring lines CW are not shown in FIG. 1. However, the display device DSP of this embodiment includes a plurality of capacitive wiring lines CW each extending along the second direction Y and aligned along the first direction.

A constant voltage Vpc from the outside is given to the capacitive wiring lines CW and the capacitive wiring lines CW are fixed at a constant potential. Further, a common voltage Vcom from the outside is given to the counter electrode CE, and the counter electrode CE is fixed at a constant potential (common potential). In this embodiment, the counter electrode CE can be referred to as a common electrode because it is shared by all pixels PX. In this embodiment, the capacitive wiring lines CW are set at the same potential as that of the counter electrode CE, but it may be set at a potential different from that of the counter electrode CE.

The first capacitance C1 and the second capacitance C2 are capacitors. The first capacitance C1 is connected between the pixel electrode PE and the respective capacitive wiring line CW. The second capacitance C2 is connected between the pixel electrode PE and the counter electrode CE.

Figure 6:
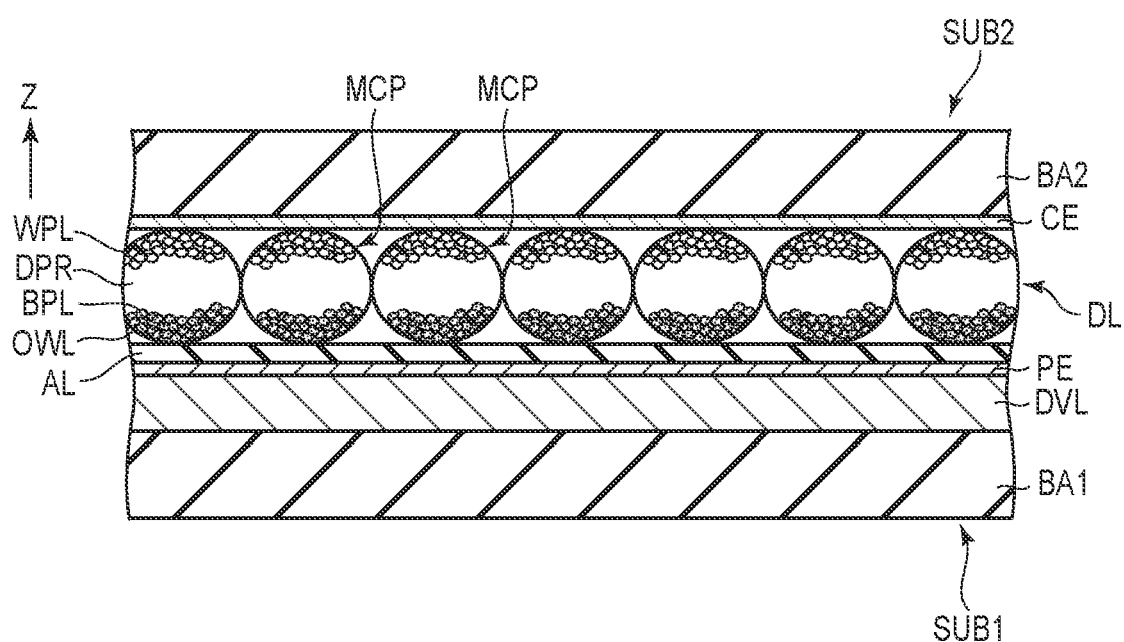
FIG. 6 is a cross-sectional view showing an example of a display device.

FIG. 6 is a cross-sectional view showing an example of the display device. The display device DSP shown in FIG. 6 is a display device which adopts electrophoresis. Here, one pixel PX will be focused.

As shown in FIG. 6, the substrate SUB1 comprises a base BA1, a drive element layer DVL provided on the base BA1 and a pixel electrode PE provided on the drive element layer DVL.

Note that the drive element layer DVL includes the above-described transistors Tr1 and Tr2, a scanning line GL, a signal line GL, wiring layers, insulating layers and the like.

The substrate SUB2 comprises a base BA2 opposing the pixel electrode PE and a counter electrode CE located between the base BA2 and the pixel electrode PE and opposing the pixel electrode PE. The counter electrode CE is a transparent conductive material such as indium tin oxide (ITO), indium zinc oxide (IZO) or the like.

In this embodiment, the substrate SUB1 is a pixel substrate and the substrate SUB2 is a counter Substrate. The substrates BA1 and BA2 are each formed of an insulating material such as resin, glass or the like. In this embodiment, the base BA2 is located on a screen side (observation side) and is light transmissive. The base BA1 is located on an opposite side to the screen, and therefore it may be opaque or transparent.

The display functional layer DL of the display device DSP is located between the pixel electrode PE and the counter electrode CE. To the display functional layer DL, a voltage applied between the pixel electrode PE and the counter electrode CE is applied. In this embodiment, the display device DSP is an electrophoretic display device, and the display functional layer DL is an electrophoretic layer. The display functional layer DL is formed of a plurality of microcapsules MCP arranged in the X-Y plane without any substantial gaps therebetween.

The display device DSP comprises an adhesive layer AL located between the pixel electrode PE and the display functional layer DL.

The microcapsules MCP are, for example, spherical bodies having a particle diameter of 20 μm to 70 μm. In the example illustrated, due to the scale, a great number of microcapsules MCP are placed between one pixel electrode PE and the respective counter electrode CE, but in a rectangular or polygonal-shaped pixel PX of which a length of one side is about 100 to several hundred μm, about one to ten microcapsules MCPs are disposed.

The microcapsules MCP comprise a dispersion medium DPR, a plurality of black particles BPL and a plurality of white particles WPL. The black particles BPL and the white particles WPL may be referred to as electrophoretic particles. The microcapsules MCP each include an outer shell (wall film) OWL formed from, for example, a transparent resin such as acrylic resin. The dispersion medium DPR is a liquid which disperse black particles BPL and white particles WPL in the microcapsules MCP. The black particles BPL are particles (polymer or colloidal) made, for example, of black pigment of such as aniline black and are, for example, positively charged. The white particles WPL are particles (polymer or colloidal) made, for example, of white pigments of such as titanium dioxide and are, for example, negatively charged. To these pigments, various types of additives can be added as needed. In place of the black particles BPL and the white particles WPL, for example, pigments of such as red, green, blue, yellow, cyan, magenta and the like may as well be used.

In the display functional layer DL of the above-described configuration, when a pixel PX is to be displayed in black, the pixel electrode PE is held at a potential relatively higher than that of the counter electrode CE. That is, when the potential of the counter electrode CE is set as a reference potential, the pixel electrode PE is held at a positive polarity. Thus, the positively charged black particles BPL are attracted to the counter electrode CE, whereas the negatively charged white particles WPL are attracted to the pixel electrode PE. As a result, when the pixel PX is observed from the counter electrode CE side, black color is visually recognized. On the other hand, when a pixel PX is displayed in white, the pixel electrode PE is held at a negative polarity when the potential of the counter electrode CE is set as the reference potential. In this manner, the negatively charged white particles WPL are attracted toward the counter electrode CE, whereas the positively charged black particles BPL are attracted towards the pixel electrode PE side. As a result, when this pixel PX is observed, white color is visually recognized.

Note that in this embodiment, the pixel electrode PE is in contact with the adhesive layer AL. But an insulating protective layer may be interposed between the pixel electrode PE and the adhesive layer AL to protect the pixel electrode PE the protective layer.

As an example of the display device DSP of this embodiment, a display device employing electrophoresis is described with reference to FIG. 6. But the display device DSP of this embodiment is not limited to this example. The display device DSP of this embodiment may as well be a display device which uses a polymer dispersed liquid crystal (PDLC). Further, the display device DSP of this embodiment may as well be a display device comprising pixels PX including transistors with a high drive voltage. Or, the display device DSP of this embodiment may be a display device comprising only pixels PX including pixel transistors on the base BA1 without providing drive circuits which drive the pixels PX on the base BA1. In such a display device as well, it is possible by the present embodiment to prevent degradation of image quality and further prevent failure of the display device itself.

Note that this embodiment describes a display device, but the concept of the present invention can be applied to electronic devices other than display devices, in particular, electronic devices comprising inspection circuits. As an example of the electronic devices, more specifically, to a sensor device including a plurality of sensor electrodes arranged in a matrix, the present embodiment can be applied. When the present embodiment is applied to a sensor device, for example, the pixels PX, the scanning lines GL and the signal lines SL can be replaced by detection wiring lines. In such an electronic device as well, it is possible by the present embodiment to prevent failure of the electronic device.

<Configuration Example 1>

FIG. 7 is a circuit diagram showing another configuration example of a display device in the embodiment. Here, the configuration example shown in FIG. 7 is different from that of FIG. 2 in that the switch element includes three or more transistors connected in series.

The switch element GSW_m on the m-th row, which is arbitrary, shown in FIG. 7, includes four transistors GSW_ma, GSW_mb, GSW_mc and GSW_md connected in series. In other words, in FIG. 7, between the scanning line GL and the wiring line SBG, the four series-connected transistors are provided. That is, it can be said that there are three transistors connected in series between the transistor GSW_ma connected to the scanning line GL and the wiring line SBG. Furthermore, in other words, there are two transistors connected in series between the transistor GSW_ma connected to the scanning line GL and the transistor GSW_md connected to the wiring line SBG.

Note that in the case where there is no need to particularly distinguish from one row to another for the switch element GSW_m, the transistors GSW_ma, GSW_mb, GSW_mc and GSW_md, they are simply referred to as the switch element GSW, transistor GSW_a, GSW_b, GSW_c and GSW_d. In this configuration example, the transistor GSW_ma (transistor GSW_a), the transistor GSW_mb (transistor GSW_b), the transistor GSW_mc (transistor GSW_c) and the transistor GSW_md (transistor GSW_md) may as well be referred to as the first transistor, the second transistor, the third transistor and the fourth transistor.

The gate of the transistor GSW_ma is connected to the gate of the transistor GSW_mb, the gate of the transistor GSW_mc, the gate of the transistor GSW_md and the wiring line VEE. The source of the transistor GSW_ma is connected to the drain of the transistor GSW_mb. The drain of the transistor GSW_ma is connected to the scanning line GL_m.

The source of the transistor GSW_mb is connected to the drain of the transistor GSW_mc. The source of the transistor GSW_mc is connected to the drain of the transistor GSW_md. The source of the transistor GSW and is connected to the wiring line SBG. The above-provided descriptions are directed to the m-th row, which is arbitrary, but they can be applied to other rows.

According to the example shown in FIG. 7, as in the case of the embodiment described above, the voltage applied to the scanning line GL_m on the m-th row is expressed as a voltage Vgh, whereas the voltage applied to the scanning lines GL of the other rows is expressed as a voltage Vgl. In the example shown in FIG. 7, the number of series-connected transistors included in the switch element GSW_m, in other words, the number of transistors connected in series to the transistor GSW_ma is greater than that of the example shown in FIG. 2. With this configuration, even when the effect of depletion of the transistors included in the switch element GSW is great, that is, even when the amount of shift of the threshold voltage to the negative side is large in the transistors, the effect of depletion can be mitigated.

This configuration example describes the case where the switch element GSW includes four transistors, but is not limited to this. The switch element GSW may as well include three or five or more transistors connected in series. The number of transistors included in the switch element GSW may be determined as appropriate in light of the effect of depletion and the size of the non-display area.

In the case where the switch element GSW includes three transistors, it can be said as well that two transistors connected in series are located between the transistor GSW_ma connected to the scanning line GL and the wiring line SBG. In other words, one transistor is connected in series between the transistor GSW_ma connected to the scanning line GL and the transistor GSW_md connected to the wiring line SBG.

Let us further consider that, as described above, the transistor GSW_ma functions as a switching element and the transistors GSW_mb, GSW_mc and GSW_mb function as the voltage drop element for the switching element. In this case, this configuration can be considered as that multiple voltage-drop elements are connected to a switching element.

In this configuration example as well, advantageous effects similar to those of the above-described embodiment can be exhibited.

<Configuration Example 2>

FIG. 8 is a circuit diagram showing another configuration example of the display device in the embodiment. The configuration example shown in FIG. 8 is different from that of FIG. 2 in that the switch element includes a transistor connected to a diode, and the diode-connected transistor is connected in both directions.

The switch element GSW_m on the m-th row, which is arbitrary, shown in FIG. 8, includes a transistor GSW_ma having a switching function, and transistors DTR_mb and DTR_mc connected bi-directionally to each other and to each of which, are diode-connection transistors.

In other words, the switch element GSW_m shown in FIG. 8 includes the transistor GSW_ma connected to the scanning line GL and located between the scanning line GL and the wiring line SBG, and the two transistors DTR_mb and DTR_mc between the transistor GSW_ma and the wiring line SBG. The transistors DTR_mb and DTR_mc are diode-connection transistors. The transistors DTR_mb and DTR_mc are bi-directionally connected to each other, and more specifically, the source of one transistor is connected to the drain of the other, and the drain of one transistor is connected to the source of the other.

In this configuration example, the transistors DTR_mb and DTR_mc are each diode-connected and connected bi-directionally to each other are referred to as a transistor pair PD_m1.

Note that in the case where there is no need to particularly distinguish from one row to another for the switch element GSW_m, the transistors GSW_ma, DTR_mb and DTR_mc and the transistor pair PD_m1, they are simply referred to as the switch element GSW, transistors GSW_a, DTR_b, DTR_c and the transistor pair PD_1. In this configuration example, the transistor GSW_ma (transistor GSW_a), transistor DTR_mb (transistor DTR_b), transistor DTR_mc (transistor transistor DTR_c) may as well be referred to as the first transistor, the second transistor and the third transistor. The first transistor, second transistor, and third transistor may be, for example, the oxide semiconductor transistors described above.

The gate of the transistor GSW_ma is connected to the wiring line VEE. The source of the transistor GSW_ma is connected to the source of the transistor DTR_mb and the drain and gate of the transistor DTR_mc. The drain of the transistor GSW_ma is connected to the scanning line GL_m.

The source of the transistor GSW_mb is connected to the gate of the transistor DTR_mb, the source of the transistor DTR_mc and the wiring line SBG.

In FIG. 8, the source of the transistor GSW_ma, the source of the transistor DTR_mb and the drain of the transistor DTR_mc are referred to as a node NA_m. When the voltage of the node NA_m is at the voltage Va, the voltage drops at between the terminals of each diode (in this case the voltage between the source and drain of the transistor) because the transistors DTR_mb and DTR_mc are diode-connected. Thus, a relationship of Vgh>Va>Vgl (Formula 6) is established.

The gate-to-source voltage Vgs of the transistor GSW_ma is expressed by, as in the case of Formula 2, Vgs=Vee−Va (Formula 7). Further, as described above, the voltage Vee applied to the gate is equal to the voltage Vgl (Vee=Vgl (Formula 3)). From Formula 7 and Formula 3, as in the case of Formula 4, a relationship of Vgs=Vee−Va=Vgl−Va (Formula 8). From Formula 8 and Formula 6, a relationship of Vgs=Vgl−Va<0 (Formula 9) is established.

That is, in the transistor GSW_ma, the gate-source voltage Vgs is less than 0. Therefore, even if the threshold of the transistor GSW_ma is depleted, the effect of depletion can be mitigated. As a result, it is possible to suppress the voltage Vgh from the scanning line GL_m from being input to the wiring line SBG.

The above-provided descriptions are directed to the m-th row, which is arbitrary, but they can be applied to other lines as well.

Let us now focus on the transistor pair PD_m1 for the transistor GSW_ma. Here, it can be said that the transistor pair PD_m1 is an element which gives an intermediate voltage Va to the node NA_m, which is the source of the transistor GSW_ma. As indicated by Formula 6, the voltage Vgh applied to the transistor GSW_ma via the scanning line GL_m is less than the voltage Va of the node NA_m. This means that the voltage is dropping between the source and drain of the transistor GSW_ma. Therefore, it can be said that the transistor pair PD_m1 is a voltage drop element for the transistor GSW_ma. That is, in this embodiment, it can be considered as well that the transistor GSW_ma functions as a switching element and the transistor pair PD_m1 functions as a voltage drop element for the switching element.

In the configuration example described above, it is possible to suppress the failure of the drive element DIG and the power supply circuit which generates the power supply voltage. Thus, the deterioration of the image quality of the display device DSP can be prevented. Further, it is also possible to prevent the failure of the display device DSP itself.

In this configuration example as well, advantageous effects similar to those of the above-described embodiment can be exhibited.

<Configuration Example 3>

Figure 9:
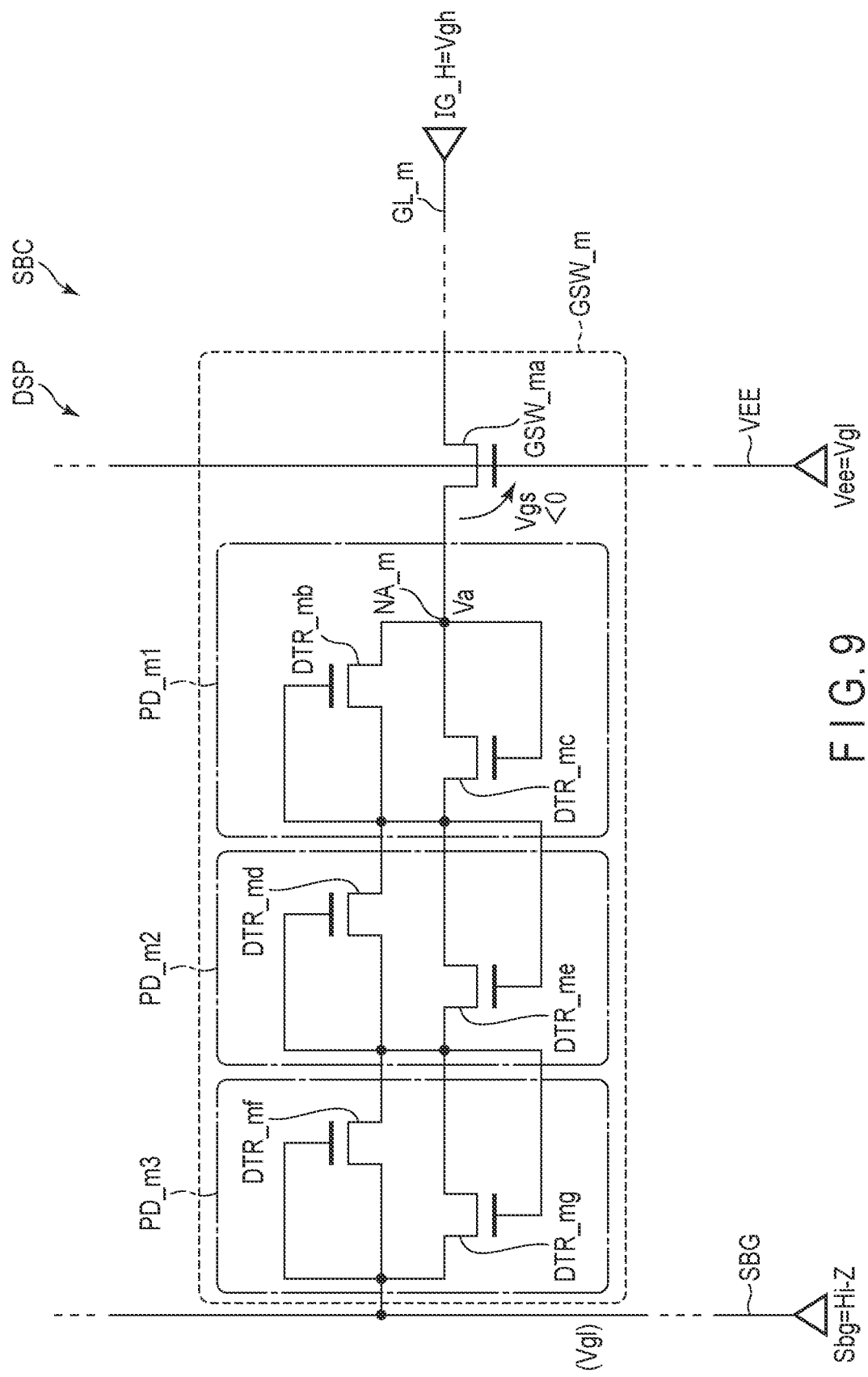
FIG. 9 is a circuit diagram of still another configuration example of the display device in the embodiment.

FIG. 9 is a circuit diagram showing still another configuration example of the display device in the embodiment. The configuration example shown in FIG. 9 is different from that of FIG. 8 in that it includes a plurality of transistors which are bi-directionally connected to each other and each of which is diode-connected.

The switch element GSW_m in the m-th row, which is arbitrary, shown in FIG. 9, includes a transistor GSW_ma having a switching function and three transistor pairs PD_m1, PD_m2 and PD_m3 connected in series. The transistor pair PD_m1 includes transistors DTR_mb and DTR_mc which are bi-directionally connected to each other and each of which is diode-connected. The transistor pair PD_m2 includes transistors DTR_md and DTR_me which are bi-directionally connected to each other and each of which is diode-connected. The transistor pair PD_m3 includes transistors DTR_mf and DTR_mg which are bi-directionally connected to each other and each of which is diode-connected. In the two transistors which are bi-directionally connected to each other, the source of one transistor is connected to the drain of the other, and the drain of one transistor is the source of the other, as described above.

The gate of the transistor GSW_ma is connected to the wiring line VEE. The drain of the transistor GSW_ma is connected to the scanning line GL_m. The source of the transistor GSW_ma is connected to the source of the transistor DTR_mb, and the drain and gate of the transistor DTR_mc.

The gate of the transistor DTR_mb is connected to the drain of the transistor DTR_mb, the source of the transistor DTR_mc, the source of the transistor DTR_md, and the gate and drain of the transistor DTR_me.

The gate of the transistor DTR_md is connected to the drain of transistor DTR_md, the source of the transistor DTR_me, the source of the transistor DTR_mf, and the gate and drain of the transistor DTR_mg.

The gate of the transistor DTR_mf is connected to the drain of the transistor DTR_mf, the source of the transistor DTR_mg and the wiring line SBG.

Note that in the case where there is no need to particularly distinguish from one row to another for the switch element GSW_m, the transistors GSW_ma, DTR_mb, DTR_mc, DTR_md, DTR_me and DTR_mf and the transistor pairs PD_m1, PD_m2 and PD_m3, they are simply referred to as the switch element GSW, transistors GSW_a, DTR_b, DTR_c, DTR_d, DTR_e and DTR_f and transistor pairs PD_1, PD_2 and PD_3, respectively. Further, in this configuration example, the transistor GSW_ma (transistor GSW_a), transistor DTR_mb (transistor DTR_b), transistor DTR_mc (transistor DTR_c), transistor DTR_md (transistor DTR_d), transistor DTR_me (transistor DTR_e) and transistor DTR_mf (transistor DTR_f) may as well be referred to as the first transistor, the second transistor, the third transistor, the fourth transistor, the fifth transistor, the sixth transistor and the seventh transistor, respectively. Further, the transistor pairs PD_1, PD_2 and PD_3 may as well be referred to as the first transistor pair, the second transistor pair and the third transistor pair, respectively.

In FIG. 9, as described above, the switch element GSW_m in the m-th row, which is arbitrary, includes a transistor GSW_ma having a switching function and three transistor pairs PD_m1, PD_m2 and PD_m3 connected in series. In other words, there are two transistor pairs connected in series between the transistor GSW_ma connected to the scanning line GL and the wiring transistor pair PD_m3 connected to the wiring line SBG.

In the example shown in FIG. 9, as in the embodiment described above, the voltage applied to the scanning line GL_m in the m-th row is expressed by the voltage Vgh, and the voltage applied to the scanning lines GL in the other rows is expressed by the voltage Vgl. In the example shown in FIG. 9, the number of transistor pairs connected in series included in the switch element GSW_m, in other words, the number of transistor pairs connected in series to the transistor GSW_ma is greater than that of the example shown in FIG. 8. Therefore, even when the effect of depletion of the transistors included in the switch element GSW is large, that is, even when the amount of shift of the threshold voltage to the negative side is large, the effect of depletion can be mitigated.

This configuration example describes the case where the switch element GSW includes three transistor pairs, but is not limited to this. The switch element GSW may include three or five or more transistor pairs. The number of transistor pairs included in the switch element GSW may be determined as appropriate in light of the effect of the depletion and the size of the non-display area.

When the switch element GSW includes three transistor pairs, it can be said that there are two transistor connected in series between the transistor GSW_ma connected to the scanning line GL and the wiring line SBG. In other words, one transistor is connected in series between the transistor GSW_ma connected to the scanning line GL and one transistor pair connected to the wiring line SBG.

Further, when it is considered as described above, that is, the transistor GSW_ma functions as a switching element, and the transistor pair PD_m1, PD_m2 and PD_m3 function as a voltage drop element for the switching element, this configuration can be regarded as that multiple voltage drop elements are connected to the switching element.

In this configuration example as well, advantageous effects similar to those of the embodiment can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a plurality of scanning lines extending along a first direction and aligned along a second direction intersecting the first direction;
a plurality of signal lines extending along the second direction and aligned the first direction;
a plurality of pixels disposed in a display area and provided at intersections of the plurality of scanning lines and the plurality of signal lines; and
an inspection circuit disposed in a non-display area different from the display area and including a plurality of first switch elements connected to the plurality of scanning lines;
a plurality of second switch elements disposed in the non-display region and connected to the plurality of signal lines, wherein
the plurality of first switch elements is oxide semiconductor transistors including an oxide semiconductor layer,
each of the plurality of first switch elements of the inspection circuit includes at least two transistors connected in series to one of the plurality of scanning lines,
the at least two transistors include a first transistor and a second transistor,
a gate of the first transistor and a gate of the second transistor are connected to a first wiring line,
one of a source and a drain of the first transistor is connected to the other of a source and a drain of the second transistor,
the other of a source and a drain of the first transistor is connected to a first scanning line of the plurality of scanning lines,
one of the source and the drain of the second transistor is connected to a second wiring line,
the second wiring is connected to one of the source and the drain of the second transistor of the first switch element connected to a second scanning line different from the first scanning line,
the plurality of second switch elements include third transistors, and
a gate electrode of each of the third transistors is connected to the first wiring line.

2. The electronic device according to claim 1, wherein the at least two transistors connected in series include three or more transistors connected in series.

3. The electronic device according to claim 1, wherein the at least two transistors connected in series include two or more transistors between the transistor connected to the first scanning line and the second wiring line.

4. An electronic device comprising:
a plurality of scanning lines extending along a first direction and aligned along a second direction intersecting the first direction;

a plurality of signal lines extending along the second direction and aligned along the first direction;
a plurality of pixels disposed in a display area and provided at intersections of the plurality of scanning lines and the plurality of signal lines; and
an inspection circuit disposed in a non-display area different from the display area, including a plurality of first switch elements connected to the plurality of scanning lines, wherein
the plurality of first switch elements of the inspection circuit are oxide semiconductor transistors each including an oxide semiconductor layer,
each of the plurality of first switch elements includes a first transistor and at least one transistor pair,
the at least one transistor pair includes a second transistor and a third transistor which are bi-directionally connected each other and each of which is diode-connected,
a gate of the first transistor is connected to a first wiring line,
one of a source and a drain of the first transistor is connected to one of a source and a drain of the second transistor and the other of a source and a drain and a gate of the third transistor,
the other of the source and the drain of the first transistor is connected to a first scanning line of the plurality of scanning lines,
a gate of the second transistor is connected to the other of the source and the drain of the second transistor, one of the source and the drain of the third transistor and a second wiring line, and
the second wiring line is connected to the gate and the other of the source and the drain of the second transistor connected to a second scanning line different from the first scanning line, and one of a source and a drain of the third transistor.

5. The electronic device according to claim 4, wherein the at least one transistor pair includes two or more transistor pairs connected in series.

6. The electronic device according to claim 4, wherein the at least one transistor pair includes two or more transistor pairs between a first transistor connected to the first scanning line and the second wiring line.

7. The electronic device according to claim 4, further comprising a plurality of second switch elements disposed in the non-display region and connected to the plurality of signal lines.

8. The electronic device according to claim 4, wherein the first transistor, the second transistor and the third transistor are oxide semiconductor transistors each including an oxide semiconductor layer.

9. The electronic device according to claim 1, further comprising:
a base on which the display area and the non-display area are provided; and
a drive element provided on the base, which drives the plurality of scanning lines.

10. A display device comprising:
a plurality of scanning lines extending along a first direction and aligned along a second direction intersecting the first direction;
a plurality of signal lines extending along the second direction and aligned the first direction;
a plurality of pixels disposed in a display area and provided at intersections of the plurality of scanning lines and the plurality of signal lines; and
an inspection circuit disposed in a non-display area different from the display area and including a switch element and a voltage drop element connected to the switch element, connected to each of the plurality of scanning lines, wherein
the switch element and the voltage-drop element are oxide semiconductor transistors each including an oxide semiconductor layer,
the switching element includes a first transistor,
a gate of the first transistor is connected to a first wiring line,
the voltage drop element includes at least one transistor pair connected in series to the switch element,
the at least one transistor pair includes a second transistor and a third transistor which are bi-directionally connected to each other and each of which is diode-connected,
one of a source and a drain of the first transistor is connected to one of a source and a drain of the second transistor and one of a source and a drain and a gate of the third transistor,
the other of the source and the drain of the first transistor is connected to a first scanning line of the plurality of scanning lines, and
a gate of the second transistor is connected to the other of the source and the drain of the second transistor, the other of the source and the drain of the third transistor and a second wiring line.

11. The display device according to claim 10, wherein the voltage drop element includes at least one transistor connected in series to the switch element.

12. The display device according to claim 10, wherein the voltage drop element includes a plurality of transistors connected in series to one of the plurality of scanning lines, and
one of the plurality of transistors is connected in series to the switch element.

13. The display device according to claim 10, wherein the voltage drop element includes a plurality of transistor pairs connected in series,
each of the plurality of transistor pairs includes two transistors bi-directionally connected to each other and each of which is diode-connected, and
one of the plurality of transistor pairs is connected in series to the switch element.

* * * * *